United States Patent
Kwon

(10) Patent No.: US 9,145,949 B2
(45) Date of Patent: Sep. 29, 2015

(54) REDUCER OF ELECTRIC POWER STEERING APPARATUS

(71) Applicant: MANDO CORPORATION, Pyeongtaek-si, Gyeonggi-do (KR)

(72) Inventor: Hyun Bi Kwon, Yongin-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/308,485

(22) Filed: Jun. 18, 2014

(65) Prior Publication Data

US 2015/0059506 A1    Mar. 5, 2015

(30) Foreign Application Priority Data

Aug. 27, 2013    (KR) .................. 10-2013-0101681

(51) Int. Cl.
| | |
|---|---|
| F16H 1/16 | (2006.01) |
| F16C 25/06 | (2006.01) |
| F16C 27/00 | (2006.01) |
| F16H 57/022 | (2012.01) |
| F16C 25/00 | (2006.01) |
| F16H 55/24 | (2006.01) |
| F16H 57/02 | (2012.01) |
| F16C 27/08 | (2006.01) |
| F16H 57/12 | (2006.01) |

(52) U.S. Cl.
CPC ........ *F16H 1/16* (2013.01); *F16C 25/00* (2013.01); *F16C 25/06* (2013.01); *F16C 27/00* (2013.01); *F16H 57/022* (2013.01); *F16C 27/08* (2013.01); *F16H 55/24* (2013.01); *F16H 57/12* (2013.01); *F16H 2057/02021* (2013.01); *F16H 2057/0222* (2013.01); *F16H 2057/0225* (2013.01)

(58) Field of Classification Search
CPC ............ F16H 1/12; F16H 1/16; F16H 57/01; F16H 57/022; F16H 57/0222; F16H 57/0225; F16H 57/0228; F16H 2057/012; F16H 2057/02021; F16H 2057/2013; F16C 4/06; F16C 25/00; F16C 25/06; F16C 27/00; F16C 27/04
USPC ...... 74/388 PS, 425; 384/519, 535, 581, 583, 384/247, 257–260; 267/160, 161; 188/67, 188/196 V
See application file for complete search history.

(56) References Cited

U.S. PATENT DOCUMENTS

| | | | | |
|---|---|---|---|---|
| 1,643,156 | A * | 9/1927 | Farmer .................. | 384/519 |
| 3,009,748 | A * | 11/1961 | Pitner .................. | 384/581 |
| 3,264,042 | A * | 8/1966 | Maly et al. .......... | 384/447 |
| 5,082,299 | A * | 1/1992 | Beattie ................ | 279/133 |
| 6,527,642 | B1 * | 3/2003 | Arai et al. ............ | 464/104 |
| 2002/0017420 | A1* | 2/2002 | Kinme et al. ........ | 180/444 |
| 2006/0078244 | A1* | 4/2006 | Lee et al. ............ | 384/535 |
| 2006/0117883 | A1* | 6/2006 | Yasuda et al. ....... | 74/388 PS |

* cited by examiner

*Primary Examiner* — William Kelleher
*Assistant Examiner* — Bobby Rushing, Jr.

(57) ABSTRACT

The present invention relates to a reducer of an electric power steering apparatus. According to the exemplary embodiments of the present invention, a damping member is provided on an outer circumference surface of a bearing bush so that impact between a worm shaft bearing and a bearing bush can be dampened, and noise generated at the time of impact can be reduced.

6 Claims, 7 Drawing Sheets

REDUCER OF ELECTRIC POWER STEERING APPARATUS

CROSS-REFERENCE TO RELATED APPLICATION

This application claims priority from and the benefit under 35 U.S.C. §119(a) of Korean Patent Application No. 10-2013-0101681, filed on Aug. 27, 2013, which is hereby incorporated by reference for all purposes as if fully set forth herein.

BACKGROUND OF THE INVENTION

1. Field of the Invention

The present invention relates to a reducer of an electric power steering apparatus, and more particularly, a reducer of electric power steering apparatus in which a damping member is provided on an outer circumference surface of a bearing bush so that impact between a worm shaft bearing and the bearing bush is dampened, and noise generated at a time of impact is reduced.

2. Description of the Prior Art

FIG. 1 is a cross-sectional view illustrating a conventional reducer of an electric power steering apparatus.

As illustrated in FIG. 1, a conventional reducer 100 of an electric power steering apparatus is provided with a worm shaft 103 which is formed with a worm 101 on an outer circumference surface thereof. Worm shaft bearings 105a and 105b are installed on both ends of the worm shaft 103, respectively, so as to support the worm shaft 103. A plug bolt 107 is fastened between a damping coupler 109 and the worm shaft bearing 105b so as to prevent the worm shaft bearing 105b from being moved in an axial direction of the worm shaft 103. The plug bolt 107 is anchored by a plug nut 111.

The worm shaft 103 is connected with a motor shaft 115 of a motor 113 via a damping coupler 109 such that the worm shaft 103 is rotated when the motor 113 is driven.

In addition, a worm wheel 117 is provided on one diametric side of the worm 101 to be tooth-engaged with a worm 101 formed on the worm shaft 103. The worm wheel 117 is mounted on a steering shaft 119 configured to transmit a rotation force of a steering wheel (not illustrated) operated by a driver, so that a rotation force of the worm shaft 103 generated by driving the motor 113 is transmitted to the steering shaft 119.

The worm shaft 103, the worm wheel 117 etc. are disposed within a gear housing 121 and the motor 113 configured to provide a driving force to the worm shaft 103 is provided on a side of the gear housing 121, in which a motor cover 123 is coupled to the gear housing 121 through a bolt 125.

Balls 131 are interposed between an inner wheel 127 and an outer wheel 129 of the worm shaft bearing 105b so as to support the rotation of the worm shaft 103 connected with the motor shaft 115 of the motor 113.

The reducer of the electric power steering apparatus configured as described above controls the driving of the motor 113 by an electronic control unit provided in a vehicle according to a vehicle driving condition, the rotation force of the worm shaft 103 generated by driving the motor 113 is added to the rotation force of the steering wheel operated by the driver and transmitted to the steering shaft 119 so that the driver's steering operation state can be smoothly and stably maintained.

However, such a conventional reducer of an electric power steering apparatus causes problems in that when the endurance of the worm shaft, which is rotated by driving the motor, and the worm, which is wheel tooth-engaged with the worm formed on the worm shaft, is consumed, a clearance is increased, which not only causes occurrence of noise, but also causes a steering-assist force assisting in the driver's steering wheel operating force to be incorrectly provided.

SUMMARY OF THE INVENTION

The present invention has been made in consideration of the above-mentioned problems, and an object of the present invention is to provide a reducer of an electric power steering apparatus in which a damping member is provided on an outer circumference surface of a bearing bush so that impact between a worm shaft bearing and the bearing bush is dampened, and noise generated at a time of impact is reduced.

The object of the present invention is not limited to the above-described object and other objects not described herein will be clearly understood by a person ordinarily skilled in the related art from the following description.

According to an exemplary embodiment of the present invention, there is provided a reducer of an electric power steering apparatus, including: a worm shaft bearing coupled to a worm shaft, which is tooth-engaged with a worm wheel, at an end of the worm shaft opposite to a motor shaft coupling portion; a bearing bush fitted on an outer circumference surface of the worm shaft bearing, and formed with a first through-hole at a worm wheel side and a second through-hole at a side opposite to the worm wheel side; a damping member fitted on the outer circumference surface of the bearing bush, the damping member having an inner circumference surface, on which a first support portion configured to pass through a first through-hole to support the outer circumference surface of the worm shaft bearing and a second support portion configured to pass through a second through-hole to support the outer circumference surface of the worm shaft bearing are formed, and an outer circumference surface supported on an inner surface of a gear housing; a cover member coupled to an end of the gear housing opposite to the motor shaft coupling portion; and a compression adjustment member coupled to the gear housing, and configured to compress the outer circumference surface of the worm shaft bearing to elastically support the worm shaft bearing toward the worm wheel so as to compensate for a clearance between the worm shaft and the worm wheel.

According to another exemplary embodiment of the present invention, there is provided a reducer of an electric power steering apparatus, including: a worm shaft bearing coupled to a worm shaft, which is tooth-engaged with the worm wheel, at an end of the worm shaft opposite to a motor shaft coupling portion; a bearing bush fitted on an outer circumference surface of the worm shaft bearing and formed with a through-hole at a side opposite to a worm wheel side; a damping member fitted on an outer circumference surface of the bearing bush, the damping member having an inner circumference surface on which elongated recesses are formed in an axial direction on opposite sides of the inner circumference surface such that an inner diameter may be contracted toward the worm wheel side, and an outer circumference surface which is supported on an inner surface of a gear housing; a cover member coupled to an end of the gear housing opposite to the motor shaft coupling portion; and a compression adjustment member coupled to the gear housing, and configured to compress the outer circumference surface of the worm shaft bearing to elastically support the worm shaft bearing toward the worm wheel so as to compensate for a clearance between the worm shaft and the worm wheel.

According to still another exemplary embodiment of the present invention, there is provided a reducer of an electric power steering apparatus according to still another exemplary embodiment of the present invention includes: a worm shaft bearing coupled to a worm shaft which is tooth-engaged with a worm wheel, at an end of the worm shaft opposite to a motor shaft coupling portion; a bearing bush, one axial side of which is opened and the other axial side is closed such that the worm shaft bearing is inserted into and supported by the bearing bush, the bearing bush having an outer circumference surface on which a first through-hole is formed at a worm wheel side and a second through-hole is formed at a side opposite to the worm wheel side; a damping member formed in an annular shape to enclose the outer circumference surface of the bearing bush, the damping member having an inner circumference surface on which a first support portion that passes through the first through-hole to support the outer circumference surface of the worm shaft bearing and a second support portion that passes through the second through-hole to support the outer circumference surface of the worm shaft bearing are formed, and an outer circumference surface supported on an inner surface of the gear housing; and a compression adjustment member coupled to the gear housing, and configured to compress the outer circumference surface of the worm shaft bearing to elastically support the worm shaft bearing toward the worm wheel so as to compensate for a clearance between the worm shaft and the worm wheel.

According to the exemplary embodiments of the present invention, a damping member is provided on an outer circumference surface of a bearing bush so that impact between a worm shaft bearing and the bearing bush can be dampened and noise generated at the time of impact can be reduced.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, some exemplary embodiments of the present invention will be described in detail with reference to illustrative drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
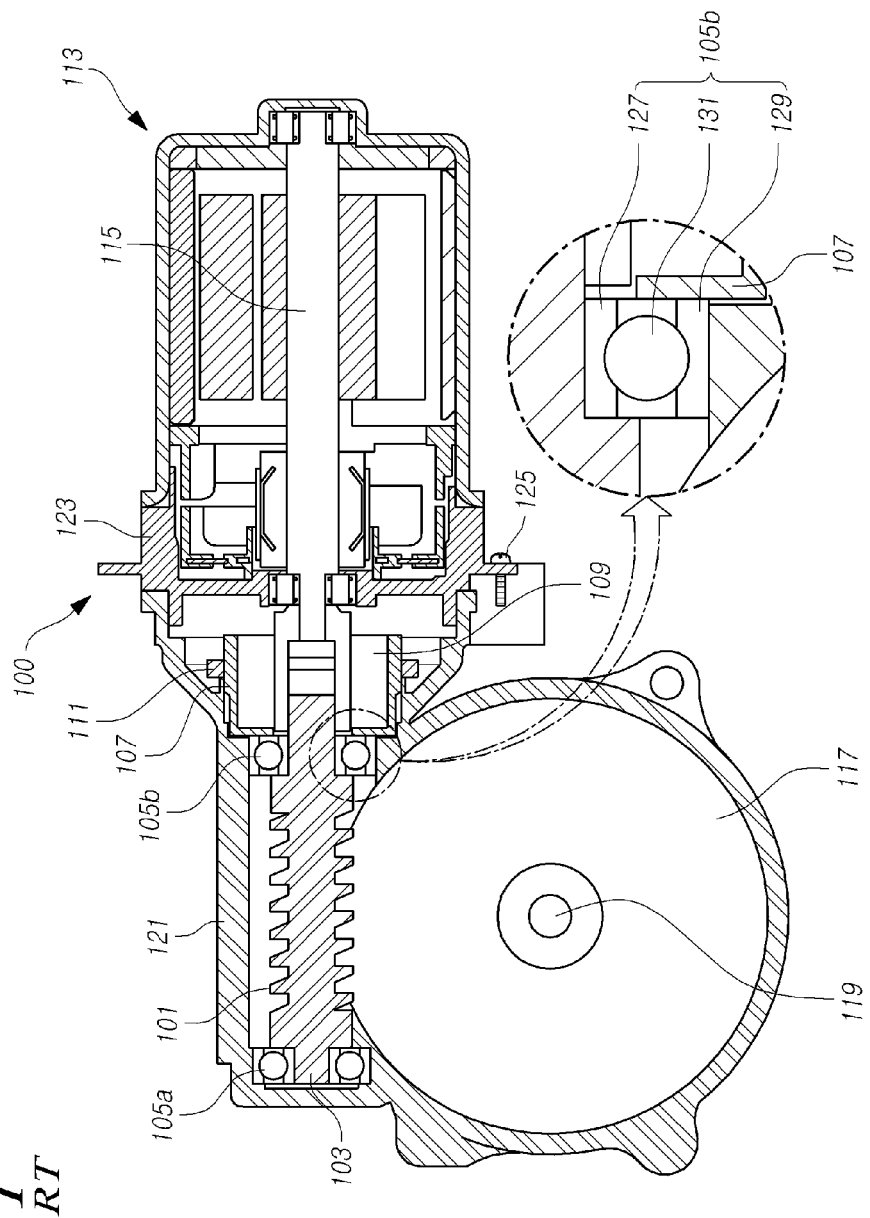
FIG. 1 is a cross-sectional view illustrating a conventional reducer of an electric power steering apparatus.
Figure 2:
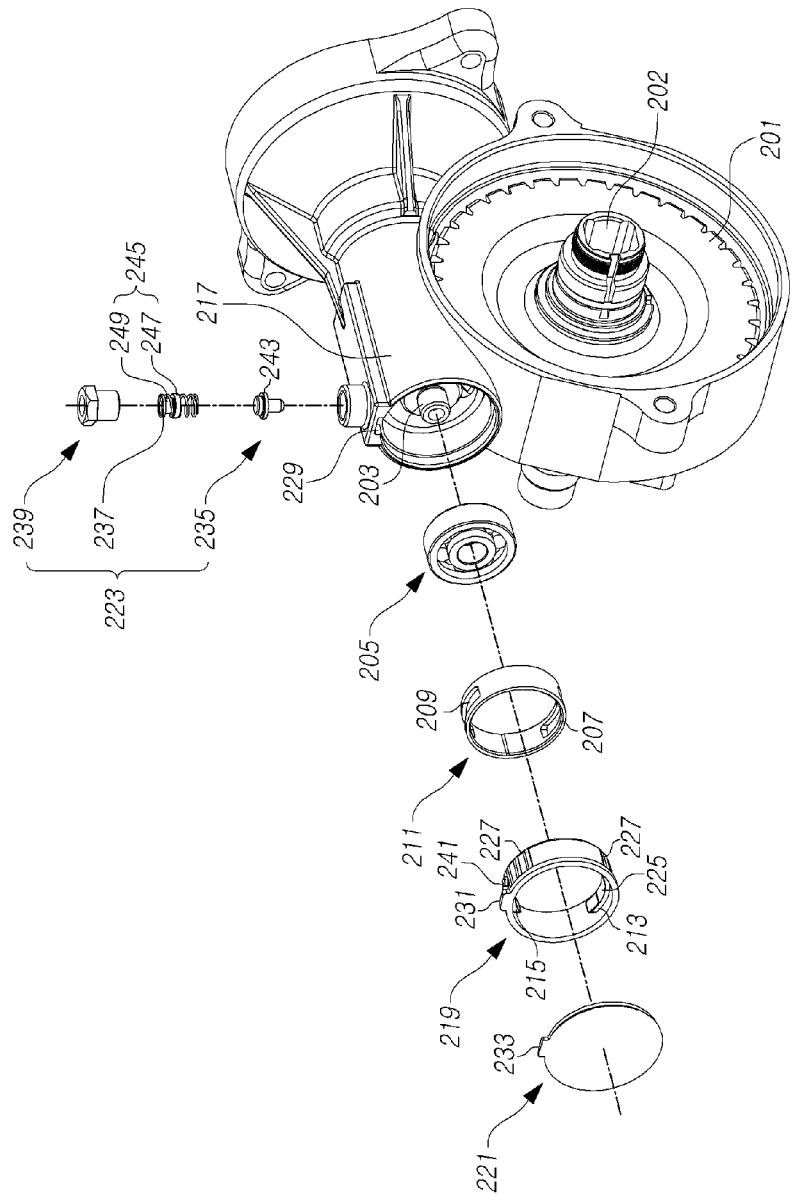
FIG. 2 is a perspective view illustrating a reducer of an electric power steering apparatus according to an exemplary embodiment of the present invention in a partially disassembled state.
Figure 3:
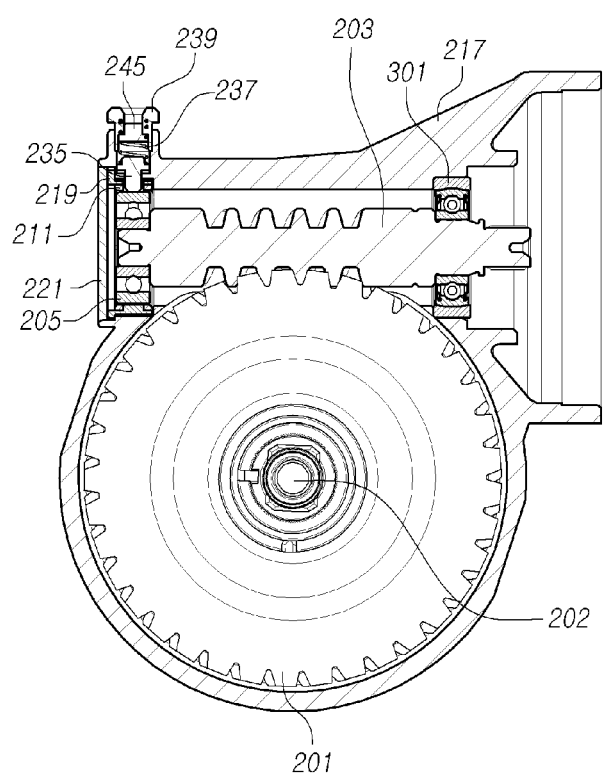
FIG. 3 is a cross-sectional view of FIG. 2.
Figure 4:
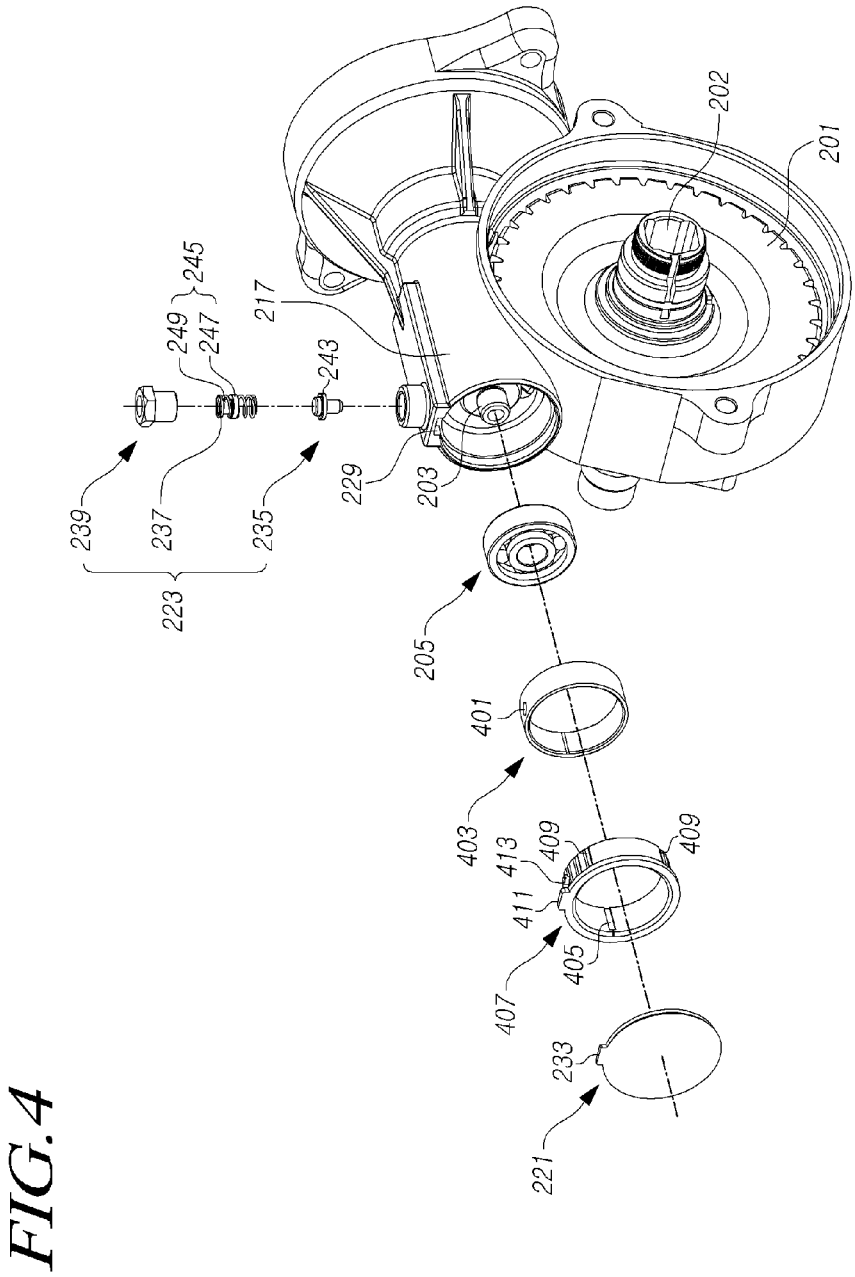
FIG. 4 is a perspective view illustrating a reducer of an electric power steering apparatus according to another exemplary embodiment of the present invention in a partially disassembled state.
Figure 5:
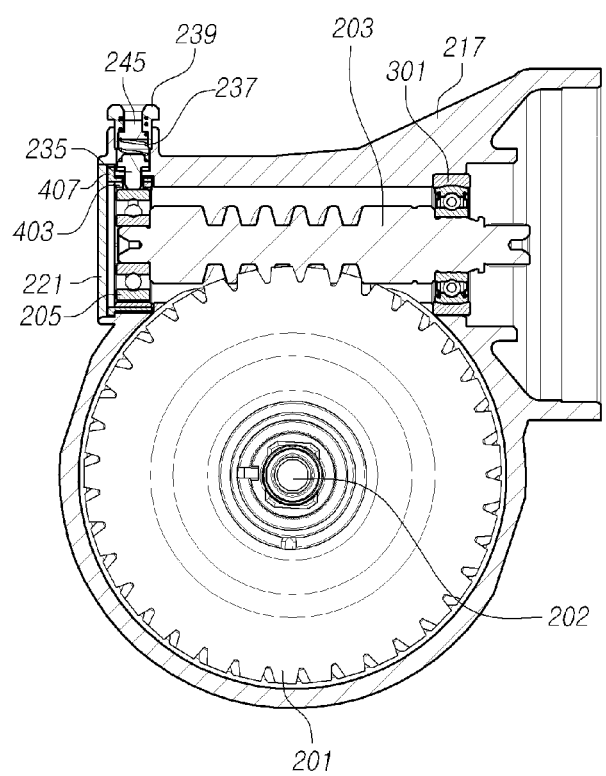
FIG. 5 is a cross-sectional view of FIG. 4.
Figure 6:
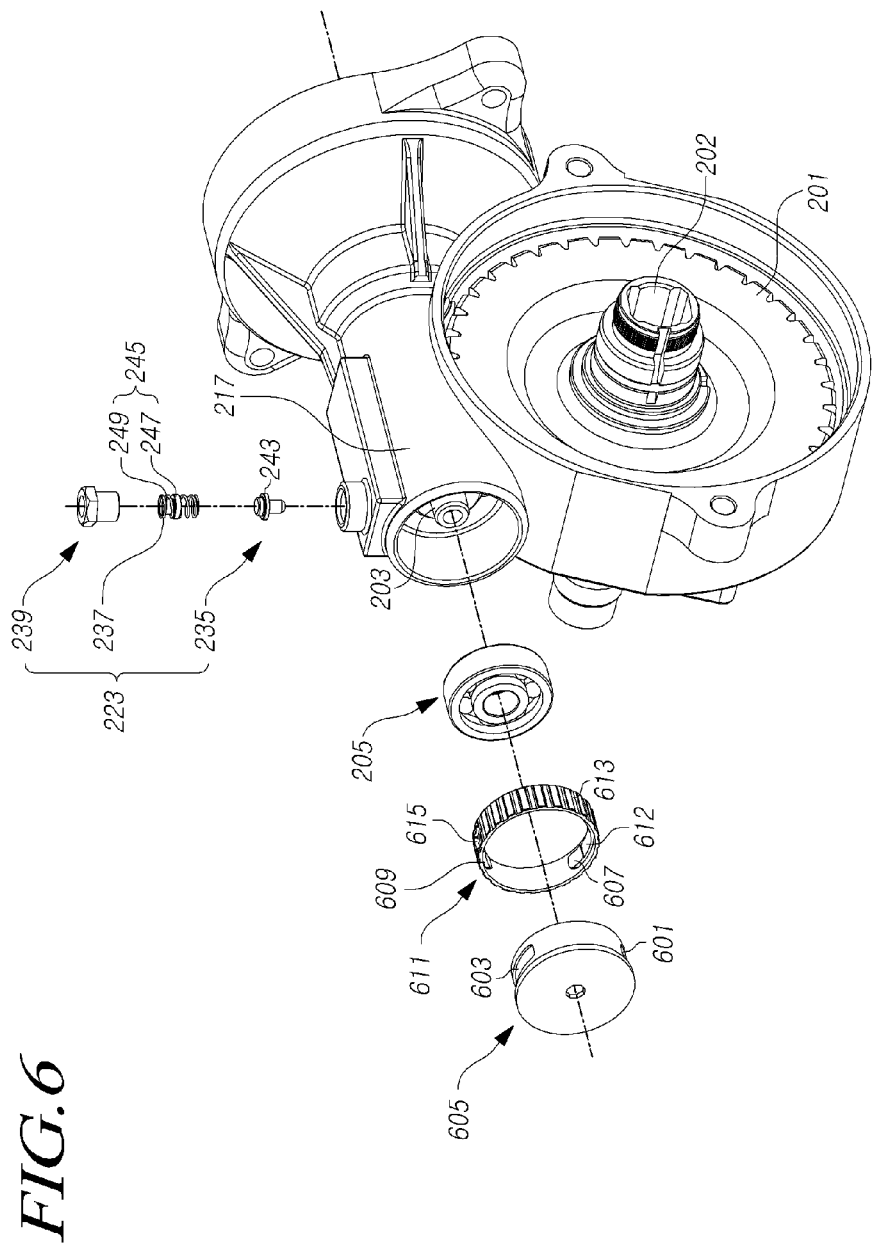
FIG. 6 is a perspective view illustrating a reducer of an electric power steering apparatus according to still another exemplary embodiment of the present invention in a partially disassembled state.
Figure 7:
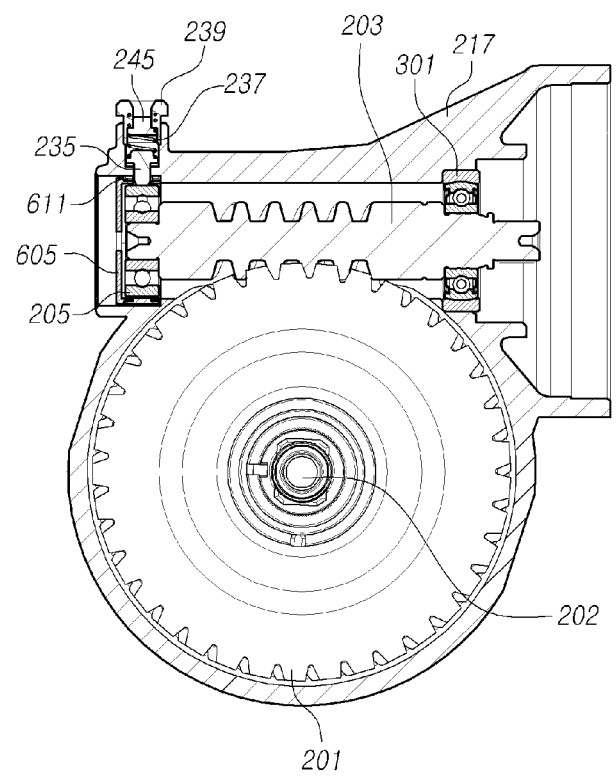
FIG. 7 is a cross-sectional view of FIG. 6.

FIG. 2 is a perspective view illustrating a reducer of an electric power steering apparatus according to an exemplary embodiment of the present invention in a partially disassembled state. FIG. 3 is a cross-sectional view of FIG. 2. FIG. 4 is a perspective view illustrating a reducer of an electric power steering apparatus according to another exemplary embodiment of the present invention in a partially disassembled state. FIG. 5 is a cross-sectional view of FIG. 4. FIG. 6 is a perspective view illustrating a reducer of an electric power steering apparatus reducer according to still another exemplary embodiment of the present invention in a partially disassembled state. FIG. 7 is a cross-sectional view of FIG. 6.

As illustrated in the drawings, a reducer of an electric power steering apparatus includes: a worm shaft bearing 205 coupled to a worm shaft 203, which is tooth-engaged with a worm wheel 201, at an end of the worm shaft 203 opposite to a motor shaft coupling portion; a bearing bush 211 fitted on an outer circumference surface of the worm shaft bearing 205, and formed with a first through-hole 207 at a worm wheel 201 side and a second through-hole 209 at a side opposite to the worm wheel side; a damping member 219 fitted on the outer circumference surface of the bearing bush 211, the damping member having an inner circumference surface, on which a first support portion 213 configured to pass through a first through-hole 207 to support the outer circumference surface of the worm shaft bearing 205 and a second support portion 215 configured to pass through a second through-hole 209 to support the outer circumference surface of the worm shaft bearing 205 are formed, and an outer circumference surface supported on an inner surface of a gear housing 217; a cover member 221 coupled to an end of the gear housing 217 opposite to the motor shaft coupling portion; and a compression adjustment member 223 coupled to the gear housing 217, and configured to compress the outer circumference surface of the worm shaft bearing 205 so as to elastically support the worm shaft bearing 205 toward the warm wheel 201 so as to compensate for a clearance between the worm shaft 203 and the worm wheel 201.

Worm shaft bearings 205 and 301 are respectively coupled to opposite ends of the worm shaft 203 and supported on the inner surface of the gear housing 217 so as to support the worm shaft 203. The worm shaft 203 is tooth-engaged with the worm wheel 201 such that when the worm shaft 203 is rotated, the worm wheel 201 is also rotated by being interlocked with the worm shaft 203, and a steering shaft 202 is coupled to the worm wheel 201 such that the driving force of the motor (not illustrated) is transmitted to the steering shaft 202 as a steering assist force through the worm shaft 203 and the worm wheel 201.

Subsequently, the bearing bush 211 is fitted on the outer circumference surface of the worm shaft bearing 205, which is coupled to the worm shaft 203, which is tooth-engaged with the worm wheel 201, at the end of the worm shaft 203 opposite to the motor shaft (not illustrated) coupling portion. The bearing bush 211 is formed in a ring shape in which the first through-hole 207 is formed in the direction toward the worm wheel and the second through-hole 209 is formed in the opposite direction thereof. That is, the first through-hole 207 and the second through-hole 209 are formed to face each other in the bearing bush 211.

Subsequently, the damping member 219 is formed in a ring shape fitted on the outer circumference surface of the bearing bush 211, in which on the inner circumference surface of the damping member 219, the first support portion 213 is formed to protrude radially inwardly at the worm wheel side, and the second support portion 215 is formed to protrude radially inwardly at the side opposite to the worm wheel side.

Accordingly, when the worm shaft bearing 205 is coupled with the bearing bush 211 and the damping member 219, the first support portion 213 of the damping member 219 passes through the first through-hole 207 of the bearing bush 211 to support the outer circumference surface of the worm shaft bearing 205, and the second support portion 215 passes through the second through-hole 209 of the bearing bush 211 to support the outer circumference surface of the worm shaft bearing 205.

Meanwhile, between the bearing bush 211 and the worm shaft bearing 205, predetermined gaps are formed at the worm wheel side and at the side opposite to the worm wheel side, respectively. When the worm shaft 203 is moved to the worm wheel side or the side opposite to the worm wheel side, the first support portion 213 and the second support portion 215 of the damping member 219 dampens the impact between the worm shaft bearing 205 and the bearing bush 211 and also reduces impact noise.

In addition, a concave portion 225 may be further formed on a radial inner circumference surface of the first support portion 213. When the concave portion 225 is formed on the first support portion 213 in this manner, a contact area between the first support portion 213 and the outer circumference surface of the worm shaft bearing 205 will be relatively reduced as compared a contact area between the second support portion 215 and the outer circumference surface of the worm shaft bearing 205.

That is, when the concave portion 225 is formed on the first support portion 213, the rigidity of the first support portion 213 will be reduced. The reason of reducing the rigidity of the first support portion 213 in this manner is due to the fact that when the rigidity of the first support portion 213 is high, the first support portion 213 is not smoothly compressed by the compression adjustment member 223 when the compression adjustment member 223 elastically supports the outer circumference surface of the worm shaft bearing 205 toward the worm wheel side at the side opposite to the worm wheel.

In addition, a plurality of axial slots 227 may be further formed on the outer circumference surface of the damping member 219 at the worm wheel side and at the side opposite to the worm wheel side. When the slots 227 are formed on the outer circumference surface of the damping member 219 in this manner, the contact area between the worm wheel side and the side opposite to the worm wheel side on the outer circumference surface of the damping member 219 and the inner surface of the gear housing 217 will be relatively reduced as compared to the contact area between the other portion of the outer circumference surface of the damping member 219 and the inner surface of the gear housing 217.

That is, when the slots 227 are formed on the outer circumference surface of the damping member 219 at the worm wheel side and at the side opposite to the worm wheel side, the rigidity of the damping member 219 is reduced at the worm wheel side and the opposite side as compared to the other sides. Thus, the damping member 219 may more effectively dampen the movement of the worm shaft bearing 205 at the worm wheel side and the side opposite to the worm wheel side.

A protruding support portion 231, which is inserted into and supported by an insertion recess 229 formed in the gear housing 217, may be further formed on the front end of the damping member 219. When the protruding support portion 231 is further formed on the damping member 219 in this manner, the damping member 219 mounted on the gear housing 217 will not be rotated about the axial direction even if the worm shaft 203 is rotated and the coupling position of the damping member 219 may be simply adjusted when the damping member 219 is coupled to the gear housing 217.

Subsequently, the cover member 221 is coupled to the end of the gear housing 217 at the end opposite to the motor shaft coupling portion, in which the cover member 221 is formed in a cylindrical shape to prevent infiltration of foreign matter or the like into the gear housing 217.

Meanwhile, a protruding support portion 233 inserted into and supported by an insertion recess 229 formed in the gear housing 217 may be further formed on the outer circumference of the cover member 221. When the protruding support portion 233 is further formed on the cover member 221 in this manner, the coupling position of the cover member 221 may be simply adjusted when the cover member 221 is coupled to the gear housing 217.

Subsequently, the compression adjustment member 223 is coupled to the gear housing 217, in which the compression adjustment member 223 compresses the outer circumference surface of the worm shaft bearing 205 so as to elastically support the worm shaft bearing 205 toward the worm wheel side so as to compensate for a clearance between the worm shaft 203 and the worm wheel 201.

An example of such a compression adjustment member 223 will be described in more detail. The compression adjustment member 223 includes: a support member 235 passes through the damping member 219 and the bearing bush 211 to support the outer circumference surface of the worm shaft bearing 205; an elastic member 237, one end of which is coupled to the support member 235; and a hollow adjustment member 239 coupled to the gear housing 217, the other end of the elastic member 237 being supported inside the hollow adjustment member 239.

The support member 235 is formed in a cylindrical shape and passes through the damping member 219 and the bearing bush 211 to support the outer circumference surface of the worm shaft bearing 205. In the exemplary embodiment illustrated in FIGS. 2 and 3, the support member 235 passes through a through-hole 241 that communicates the outer circumference of the damping member 219 on the opposite side to the worm wheel and the second support portion 215 with each other, and through the second through-hole 209 of the bearing bush 211 so as to compress the outer circumference surface of the worm shaft bearing 205.

Meanwhile, the support member 235 is formed with a stepped support portion 243 protruding radially outward such that the one end of the elastic member 237 is supported by the top surface of the stepped support portion 243 when the one end of the elastic member 237 is coupled to the support member 235.

Subsequently, the one end of the elastic member 237 is coupled to the support member 235. As described above, the one end of the elastic member 237 is supported by the stepped support portion 243 of the support member 235. As an example of such an elastic member 237, a coil spring may be provided.

Subsequently, the adjustment member 239 is coupled to the gear housing 217. Since the adjustment member 239 is provided in a hollow shape, the other end of the elastic member 237 is supported inside the adjustment member 239.

For example, such a adjustment member 239 is screw-coupled to the gear housing 217 so that an operator may adjust the elastic force of the elastic member 237 by adjusting a length of coupling the adjustment member 239 to the gear housing 217.

Meanwhile, an elastic force measurement member 245 may be further coupled to the elastic member 237 so as to conveniently measure the elastic member 237 through the hollow portion of the adjustment member 239. As illustrated, the elastic force measurement member 245 is composed of a large diameter portion 247 and a small diameter portion 249 so that the large diameter portion 247 is supported by the elastic member 237 and the small diameter portion 249 is positioned inside the elastic member 237. The operator may measure the elastic force of the elastic member 237 by inserting the elastic force measurement instrument through the hollow portion of the adjustment member 239, and pushing the small diameter portion 249.

When the elastic member 237 is provided with the elastic force measurement member 245, and the adjustment member 239 is formed in the hollow shape as described above, the elastic force of the elastic member 237 can be conveniently measured without separating the adjustment member 239 from the gear housing 217. As a result, the coupling length of the adjustment member 239 may be adjusted such that a proper elastic force can be applied to the support member 235.

Meanwhile, according to another exemplary embodiment of the present invention, a reducer of an electric power steering apparatus includes: a worm shaft bearing 205 coupled to a worm shaft 203, which is tooth-engage with the worm wheel 201, at an end of the worm shaft 203 opposite to a motor shaft coupling portion; a bearing bush 403 fitted on an outer circumference surface of the worm shaft bearing 205 and formed with a through-hole 401 in a direction opposite to a worm wheel side; a damping member 407 fitted on an outer circumference surface of the bearing bush 403, the damping member 407 having an inner circumference surface on which elongated recesses 405 are formed in an axial direction on opposite sides of the inner circumference surface such that an inner diameter may be contracted toward the worm wheel side, and an outer circumference surface which is supported on an inner surface of a gear housing 217; a cover member 221 coupled to an end of the gear housing 217 opposite to the motor shaft coupling portion; and a compression adjustment member 223 coupled to the gear housing 217, and configured to compress the outer circumference surface of the worm shaft bearing 205 to elastically support the worm shaft bearing 205 toward the worm wheel so as to compensate for a clearance between the worm shaft 203 and the worm wheel 201.

Here, the parts similar to those of the exemplary embodiment of the present invention described above with reference to FIGS. 2 and 3 will be assigned the same reference numerals and descriptions thereof will be omitted.

The bearing bush 403 is fitted on the outer circumference surface of the worm shaft bearing 205 and is provided in a ring shape. The bearing bush 403 is formed with a through-hole 401 that communicates the outer circumference surface and the inner circumference surface at a side opposite to the worm wheel so that the support member 235 of the compression adjustment member 223 may pass through the through-hole 413 of the damping member 407 and the through-hole 401 of the bearing bush 403 to support the outer circumference surface of the worm shaft bearing 205.

Subsequently, the damping member 407 is formed in a ring shape fitted on the outer circumference surface of the bearing bush 403. Elongated recesses 405 are formed on the opposite sides of the inner circumference surface of the damping member 407 in the axial direction so that the inner diameter of the damping member 407 may be smoothly contracted toward the worm wheel side when the worm shaft 203 is moved toward the worm wheel side or the side opposite to the worm wheel side, and the movement of the worm shaft 203 may be dampened.

In addition, a plurality of axial slots 409 are formed on the wheel side portion and the opposite side portion of the outer circumference surface of the damping member 407, and a protruding support portion 411 is formed on a front end of the damping member 407. The slots 409 and the protruding support portion 411 perform the same functions as the slots 227 of the damping member 219 and the protruding support portion 231 illustrated in FIGS. 2 and 3. The damping member 407 is formed with the through-hole 413 that communicates the outer circumference surface and the inner circumference surface with each other on the side opposite to the worm wheel so that the support member 235 of the compression adjustment member 223 passes through the through-hole 413 and the through-hole 401 of the bearing bush 403 to compress the outer circumference surface of the worm shaft bearing 205.

Meanwhile, a reducer of an electric power steering apparatus according to still another exemplary embodiment of the present invention includes: a worm shaft bearing 205 coupled to a worm shaft 203 which is tooth-engaged with a worm wheel 201, at an end of the worm shaft 203 opposite to a motor shaft coupling portion; a bearing bush 605, one axial side of which is opened and the other axial side is closed such that the worm shaft bearing 205 is inserted into and supported by the bearing bush 605, the bearing bush 605 having an outer circumference surface on which a first through-hole 601 is formed at a worm wheel side and a second through-hole 603 is formed at a side opposite to the worm wheel side; a damping member 611 formed in an annular shape to enclose the outer circumference surface of the bearing bush 605, the damping member 611 having an inner circumference surface on which a first support portion 607 that passes through the first through-hole 601 to support the outer circumference surface of the worm shaft bearing 205 and a second support portion 609 that passes through the second through-hole 603 to support the outer circumference surface of the worm shaft bearing 205 are formed, and an outer circumference surface supported on an inner surface of the gear housing 217; and a compression adjustment member 223 coupled to the gear housing 217, and configured to compress the outer circumference surface of the worm shaft bearing 205 to elastically support the worm shaft bearing 205 toward the worm wheel so as to compensate for a clearance between the worm shaft 203 and the worm wheel 201.

Here, the parts similar to those of the exemplary embodiments of the present invention described above with reference to FIGS. 2 and 3 will be assigned the same reference numerals, and descriptions thereof will be omitted.

The bearing bush 605 is provided in a cylindrical shape one axial side of which is opened and the other axial side is closed so that the worm shaft bearing 205 into and supported by the bearing bush 605. On the outer circumference surface of the bearing bush 605, the first through-hole 601 is formed at the worm wheel side and a second through-hole 603 is formed at the side opposite to the worm wheel side.

Subsequently, the damping member 611 is provided in an annular shape to enclose the outer circumference surface of the bearing bush 605 and the outer circumference surface is supported on the inner surface of the gear housing 217. On the inner circumference surface of the damping member 611, a first support portion 607 that passes through the first through-hole 601 of the bearing bush 605 to support the outer circumference surface of the worm shaft bearing 205 and a second support portion 609 that passes through the second through-hole 603 to support the outer circumference surface of the worm shaft bearing 205 are formed.

In addition, the first support portion 607 is formed with a concave portion 612, and a plurality of axial slots 613 are formed on the outer circumference surface of the damping member 611 in the circumferential direction. The concave portion 612 and the slots 613 perform the same functions as the concave portion 225 and the slots 227 of the damping member 219 illustrated in FIGS. 2 and 3. The damping member 611 is formed with a through-hole 615 that communicates the outer circumference surface and the inner circumference surface of the damping member 611 with each other at the side opposite to the worm wheel side so that the support member 235 of the compression adjustment member 223 passes through the through-hole 615 and the second through-hole 603 of the bearing bush 605 to compress the outer circumference surface of the worm shaft bearing 205.

As described above, according to the exemplary embodiments of the present invention, a damping member is provided on an outer circumference surface of a bearing bush so that impact between a worm shaft bearing and the bearing bush can be dampened and noise generated at the time of impact can be reduced.

Even if it was described above that all of the components of an embodiment of the present invention are coupled as a single unit or coupled to be operated as a single unit, the present invention is not necessarily limited to such an embodiment. At least two elements of all structural elements may be selectively joined and operate without departing from the scope of the present invention. Although the embodiments of the present invention have been described for illustrative purposes, those skilled in the art will appreciate that various modifications, additions and substitutions are possible, without departing from the scope and spirit of the invention. The scope of the present invention shall be construed on the basis of the accompanying claims in such a manner that all of the technical ideas included within the scope equivalent to the claims belong to the present invention.

What is claimed is:

1. A reducer of an electric power steering apparatus, comprising:
   a worm shaft bearing coupled to a worm shaft, which is tooth-engaged with a worm wheel, at an end of the worm shaft opposite to a motor shaft coupling portion;
   a bearing bush fitted on an outer circumference surface of the worm shaft bearing and formed with a through-hole at a side opposite to a worm wheel side;
   a damping member fitted on an outer circumference surface of the bearing bush, the damping member having an inner circumference surface on which elongated recesses are formed in an axial direction on opposite sides of the inner circumference surface such that an inner diameter may be contracted toward the worm wheel side, and an outer circumference surface which is supported on an inner surface of a gear housing;
   a cover member coupled to an end of the gear housing opposite to the motor shaft coupling portion; and
   a compression adjustment member coupled to the gear housing, and configured to compress the outer circumference surface of the worm shaft bearing to elastically support the worm shaft bearing toward the worm wheel so as to compensate for a clearance between the worm shaft and the worm wheel.

2. The reducer of claim 1, wherein a plurality of axial slots are formed on the outer circumference surface of the damping member at the worm wheel side and the side opposite to the worm wheel side so as to reduce a contact area between the outer circumference surface of the damping member and an inner surface of the gear housing.

3. The reducer of claim 1, wherein a protruding support portion inserted into and supported by an insertion recess formed in the gear housing is formed on an end of the damping member so as to prevent the damping member from being rotated about the axial direction.

4. The reducer of claim 3, wherein a protruding insertion portion inserted into and supported by the insertion recess formed in the gear housing is further foinied on the outer circumference of the cover member.

5. A reducer of claim 1, wherein the compression adjustment member includes:
   a support member configured to pass through the damping member and the bearing bush to support the outer circumference surface of the worm shaft bearing;
   an elastic member, one end of which is coupled to the support member; and
   a hollow adjustment member coupled to the gear housing, the other end of the elastic member being supported inside the hollow adjustment member.

6. A reducer of claim 5, wherein the elastic member is further provided with an elastic force measurement member which is come in contact with an elastic force measurement instrument so that the elastic force measurement instrument is introduced through a hollow portion of the adjustment member to measure an elastic force of the elastic member.

* * * * *